US012645450B2

(12) United States Patent
Bicik et al.

(10) Patent No.: US 12,645,450 B2
(45) Date of Patent: Jun. 2, 2026

(54) DISTRIBUTED CONTROL SYSTEM WITH SEAMLESS SOFTWARE UPDATE

(71) Applicant: ABB Schweiz AG, Baden (CH)

(72) Inventors: Josef Bicik, Prague (CZ); Piotr Powroznik, Zielonki (PL); Andrea Macauda, Genoa (IT); V Riju, Karnataka (IN)

(73) Assignee: ABB Schweiz AG, Baden (CH)

( * ) Notice: Subject to any disclaimer, the term of this patent is extended or adjusted under 35 U.S.C. 154(b) by 236 days.

(21) Appl. No.: 18/531,819

(22) Filed: Dec. 7, 2023

(65) Prior Publication Data

US 2024/0192948 A1     Jun. 13, 2024

(30) Foreign Application Priority Data

Dec. 8, 2022     (EP) .................................... 22212230

(51) Int. Cl.
*G05B 19/042*          (2006.01)
*G05B 9/02*            (2006.01)
(Continued)

(52) U.S. Cl.
CPC ..................................... *G06F 8/65* (2013.01)

(58) Field of Classification Search
CPC .... G05B 2219/25232; G05B 19/41845; G05B 19/0426; G06F 8/65; G06F 8/62; G06F 9/44; G06F 9/4856; G06F 8/20; G06F 8/70; G06F 8/71; G06F 9/455; G06F 16/119; G06F 9/44505; G06F 11/1469
See application file for complete search history.

(56) References Cited

U.S. PATENT DOCUMENTS 10,162,827 B2 * 12/2018 Sreenivasamurthy .... G06F 8/65
10,496,381 B2   12/2019 Seksenov et al.
(Continued)

FOREIGN PATENT DOCUMENTS

EP          2189900 A1     5/2010

OTHER PUBLICATIONS

European Patent Office, Extended European Search Report in European Patent Application No. 22212230.1, 11 pp. (May 10, 2023).

*Primary Examiner* — Thuy Dao
(74) *Attorney, Agent, or Firm* — Fitch Even Tabin & Flannery LLP

(57)          ABSTRACT

A distributed control system includes low-level controllers interacting with field devices, a high-level controller providing instructions, a human-machine interface that receives an input from a user transmits it to the high-level controller, receive from the high-level controller state information of the process, and display this state information to the user; first and second instances of backend software that are communicatively coupled to the high-level controller, first and second instances of frontend software running on respective client devices of the plant, and a software manager that indicates to each client device which version of frontend software is available for the client device, wherein the first instance of frontend software interfaces with the version of the first instance of backend software, and the second instance of frontend software interfaces with the version of the second instance of backend software.

15 Claims, 2 Drawing Sheets

(51) Int. Cl.

| | | |
|---|---|---|
| *G06F 8/65* | (2018.01) | |
| *G06F 8/71* | (2018.01) | |
| *G06F 9/44* | (2018.01) | |
| *G06F 13/40* | (2006.01) | |

(56) References Cited

U.S. PATENT DOCUMENTS

| | | | |
|---|---|---|---|
| 11,502,904 B2 * | 11/2022 | Seely .................... | H04L 41/082 |
| 2017/0242684 A1 | 8/2017 | Sasaki | |
| 2019/0065217 A1 | 2/2019 | Girdhar et al. | |

* cited by examiner

DISTRIBUTED CONTROL SYSTEM WITH SEAMLESS SOFTWARE UPDATE

CROSS-REFERENCE TO RELATED APPLICATIONS

The instant application claims priority to European Patent Application No. 22212230.1, filed Dec. 8, 2022, which is incorporated herein in its entirety by reference.

FIELD OF THE DISCLOSURE

The present disclosure relates to distributed control systems for the execution of industrial processes in industrial plants where a plurality of client devices communicates with a high-level controller via one or more backends.

BACKGROUND OF THE INVENTION

A distributed control system typically comprises a plurality of field devices that interact with the executed process. The field devices are controlled by low-level controllers, which are in turn controlled and overseen by one or more high-level controllers. Furthermore, the system typically comprises one or more human-machine interfaces.

In such systems, there is a frequent need for many devices in the plant that are running some frontend software to communicate with the one or more high-level controllers via backend software. Frontend software of a certain version is compatible with backend software of one or more certain versions only. Therefore, updating the backend software to a new version necessitates a simultaneous update of the frontend software on many client devices. If the update fails, the affected devices, and thus the functionality of the DCS as a whole, may be rendered inoperative at least temporarily.

BRIEF SUMMARY OF THE INVENTION

The present disclosure describes a distributed control system that is more resilient against failures of frontend software updates on client devices. The invention provides a distributed control system for controlling the execution of at least one industrial process in an industrial plant.

The DCS comprises low-level controllers that are configured to interact with field devices. The field devices are in a direct physical relationship with the industrial process. Exemplary field devices include sensors for arbitrary measurement quantities on the one hand, and actuators that affect execution of the process on the other hand, such as motors, valves, stirrers, coolers, or heaters. Low-level controllers may, for example, be programmable logic controllers, PLC.

The DCS further comprises at least one high-level controller that is configured to provide instructions for executing the industrial process, and/or set-point values at which at least one quantity of interest of the process and/or of the plant is to be kept, to the low-level controllers. For example, the high-level controller may issue an instruction to ingest batches of educts into a chemical process, a set-point at which the temperature of a reaction vessel is to be kept, or an instruction to draw product from the process. The high-level controller may also read in sensor data of any type from sensor field devices, as well as any values of quantities of interest reported by low-level controllers. That is, the high-level controller may also be an edge device that moves the processing of sensor data closer to where the sensor data is acquired and that does not require a direct connection to low-level controllers.

BRIEF DESCRIPTION OF THE SEVERAL VIEWS OF THE DRAWING(S)

DETAILED DESCRIPTION OF THE INVENTION

Figure 1:
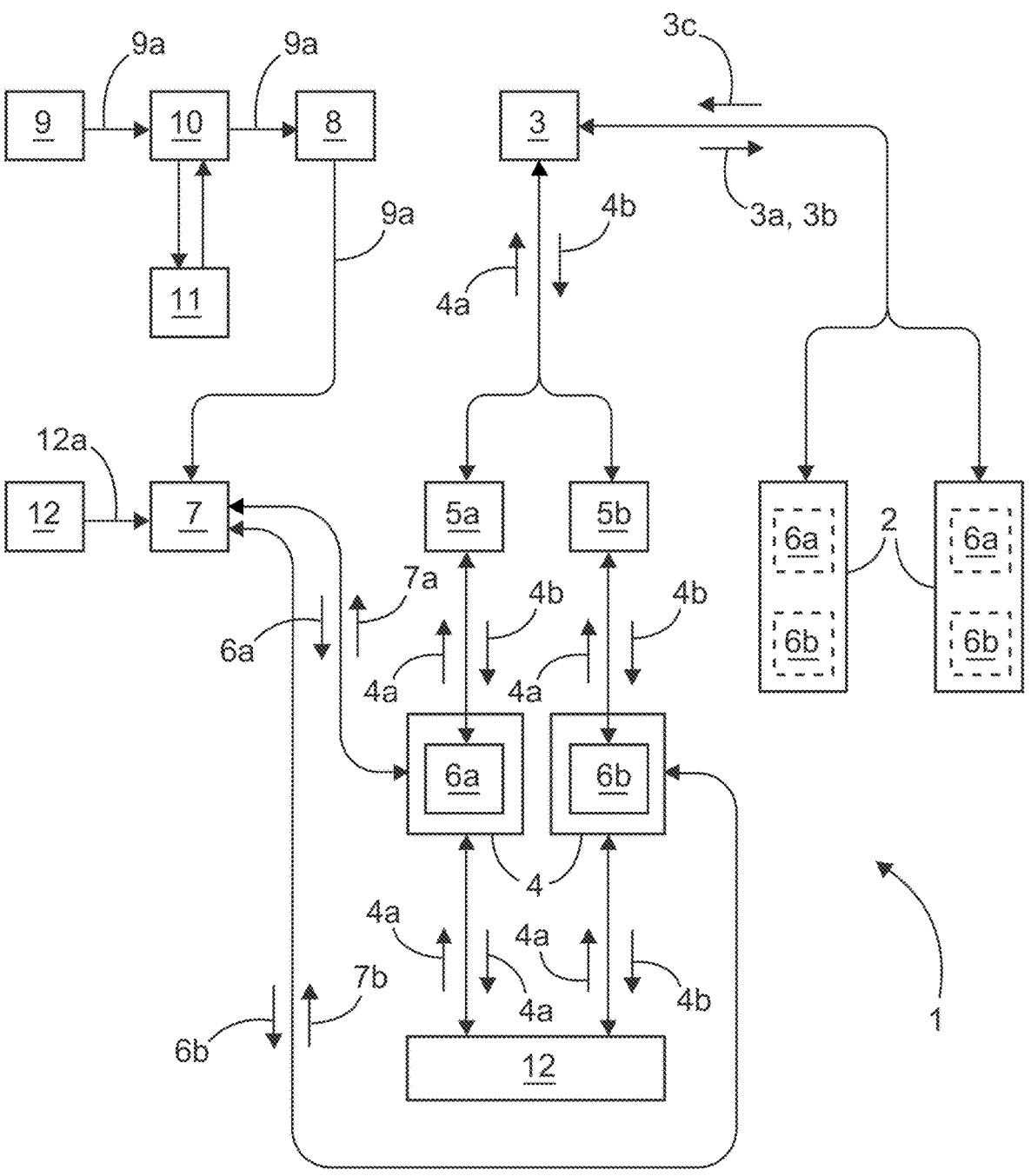
FIG. 1 is a block diagram of a distributed control system in accordance with the disclosure.
Figure 2:
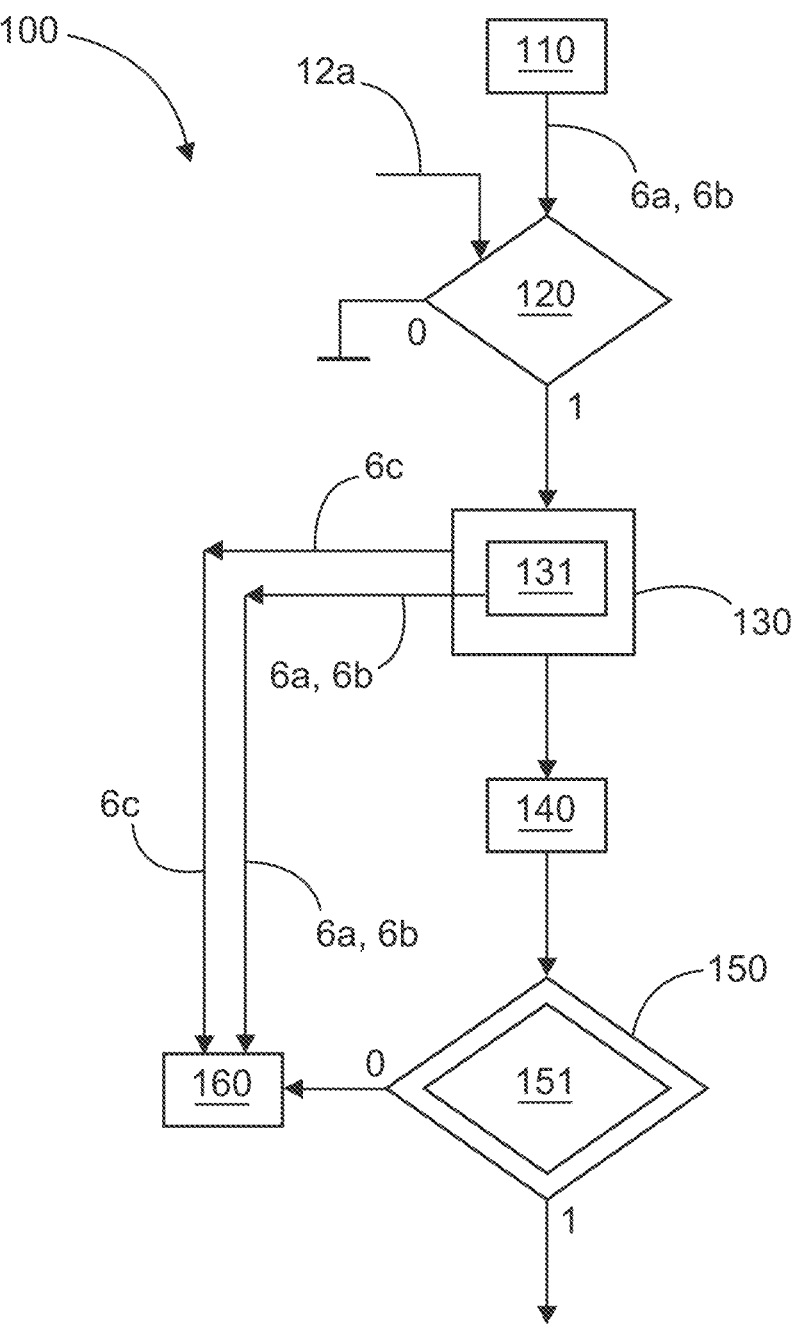
FIG. 2 is a flowchart for a method in accordance with the disclosure.

FIG. 1 is an exemplary embodiment of the DCS 1, and FIG. 2 is an exemplary embodiment of the method 100 for updating frontend software 6a, 6b on a client device in the system 1.

FIG. 1 shows an exemplary embodiment of the distributed control system, DCS 1. The DCS 1 is intended for controlling the execution of at least one industrial process in an industrial plant. The DCS 1 comprises low-level controllers 2 that are configured to interact with field devices that are in a direct physical relationship with the industrial process. There is also at least one high-level controller 3 that is configured to provide instructions 3a for executing the industrial process, and/or set-point values 3b at which at least one quantity of interest of the process and/or of the plant is to be kept, to the low-level controllers 2. The high-level controller 3 may also read in values 3c of any quantity of interest from the low-level controllers 2.

The DCS 1 also comprises human-machine interface, HMI, devices 4. These HMI devices 4 are configured to interact with a user 12 on the one hand, and with the high-level controller 3 on the other hand. This interaction is performed by instances 6a, 6b of frontend software running on the respective devices 4. The frontend software 6a, 6b takes in user input 4a and forwards this to a respective instance 5a, 5b of backend software that is in turn communicatively coupled to the high-level controller 3. In the other direction, state information 4b of the process that is being executed is sent from the high-level controller 3 to the backend software instances 5a, 5b, forwarded to the respective frontend software instances 6a, 6b, and then displayed to the user 12. The frontend software instances 6a and 6b, as well as the backend software instances 5a and 5b, are of different versions. The first instance 6a of the frontend software is of a version that is configured to interface with the version of the backend software running on the first backend instance 5a. The second instance 6b of the frontend software is of a version that is configured to interface with the version of the backend software running on the second backend instance 5b.

As it is shown in FIG. 1, likewise, frontend software 6a, 6b may also be installed on the low-level controllers 2, or still other devices, as client devices. Interaction of frontend software instances in low-level controllers 2 with backend instances 5a, 5b is not shown in FIG. 1 for clarity.

Updates of the frontend software 6a, 6b are orchestrated by the software manager 7. The software manager 7 indicates, to each client device, which versions of frontend software 6a, 6b is available to this client device. This is based on assignments 9a received from a policy server 8. A user 12 of the plant inputs conditions 12a as to when an update of the frontend software 6a, 6b is to be performed into the software manager 7. Each client device updates the frontend software when the condition 12a is fulfilled. After the update has concluded, feedback 7a, 7b as to whether the update was successful is provided by each client device to the software manager 7, so as to track the progress of the migration to the new software version throughout the plant and halt the migration immediately if a problem occurs on a client device.

The assignments 9a are provided to the policy server 8 by an administrator 9. Before they are entered into the policy server 8, they are checked, by an advisor entity 10, against a library 11 of compatibilities between available versions of frontend software 6a, 6b on the one hand and running versions of backend software 5a, 5b on the other hand.

FIG. 2 is a schematic flow chart of an exemplary embodiment of the method 100 for updating frontend software 6a, 6b on a client device in the DCS shown in FIG. 1.

In step 110, the client device determines that a new version of the frontend software 6a, 6b is available.

In step 120, the client device determines whether a predetermined condition 12a for updating is met. If this is the case (truth value 1), at least the configuration 6c of the frontend software 6a, 6b that is currently running on the client device (i.e., the previous version before the update) is backed up in step 130.

According to block 131, the previous version of the software 6a, 6b may be backed up as well.

In step 140, the new version of the frontend software 6a, 6b is installed.

In step 150, it is determined whether the installation is successful. This determining may, according to block 151, comprise performing a test suite for the new version of the frontend software.

If the installation is not successful (truth value 0), in step 160, the frontend software 6a, 6b is rolled back to the previous version, using the backed-up configuration 6c, and, if available, the backed-up previous version of the software 6a, 6b.

The DCS further comprises at least one human-machine interface, HMI, device. This HMI device is configured to receive user input from a user, and transmit the user input, and/or a work product derived from it, to the at least one high-level controller. In this manner, the user can steer the execution of the process. The HMI device is further configured to receive from the at least one high-level controller, state information of the process, and display this state information to the user. This is information on which the user may act with his next input.

This arrangement does not exclude the possibility that the HMI can directly issue instructions and/or set-point values to low-level controllers. For example, the HMI can be used to manually override instructions and/or set-point values that have previously been issued by the high-level controller. It is also not required that the HMI and the high-level controllers are strictly separate entities. For example, an HMI entity may also include functionality of the high-level controller, or a high-level controller may additionally comprise the functionality of an HMI.

The DCS comprises at least a first instance and a second instance of backend software that are both communicatively coupled to the high-level controller. These instances of backend software may run on arbitrary computing devices and/or compute instances. For example, each instance of backend software may run in a container, virtual machine or other execution environment on a hardware platform. This facilitates running multiple different versions of the backend software side by side. The versions of the backend software running on the two instances are different.

The DCS further comprises at least a first instance and a second instance of frontend software running on respective client devices. The versions of the frontend software running in the two instances are different as well.

Each version of the frontend software is configured to interface with a particular version of the backend software. That is, the first instance of frontend software is of a version that is configured to interface with the version of the first instance of backend software. The second instance of frontend software is of a different version that is configured to interface with the version of the second instance of backend software.

Herein, "configured to interface with" may, in particular, mean that the version of the frontend software is aware of all the features that the API of the version of the backend software provides, while at the same time the API of this version of the backend software understands all API calls that may be raised by the version of the frontend software. Typically, there is only one pair of a version of frontend software and a version of backend software that are really meant for each other. There may be upwards and downwards compatibilities to one extent, but they typically only cover part of the functionality. In an only upwards or downwards compatible pair of software versions, either the frontend software will not avail itself of all features that the backend software provides, or the backend software will not understand all API calls that may be raised by the frontend software.

The DCS further comprises a software manager that is at least configured to indicate, to each client device, which version of frontend software is available for this client device. In this manner, the distribution of new frontend software may be steered on a very granular level, namely per client device.

The combination of the backend software instances running different versions of the backend software with the software manager provides the resilience of the DCS when performing software updates. When a pair of a frontend software version and a backend software version is to be replaced with a new pair of versions, the new backend software may be started in a new instance while the old version continues to run. Client devices can then be migrated to the new frontend software version in a manner that any failures of the update do not render the DCS as a whole inoperative. In particular, the update may start with only one or a few client devices to check whether the update is performed correctly and whether the new version works as expected. Those one or a few client devices may be deliberately chosen such that, at the time of performing the update, they are not indispensable for the functioning of the DCS as a whole. If the update is successful, more and more client devices may be gradually updated according to any suitable schedule, until finally all client devices are running the new frontend software. That is, even if hundreds of client devices need to be updated to a new frontend software version, and they cannot be all updated at the same time, seamless operation of the DCS is ensured.

For example, new frontend software versions (and new backend software versions) may be kept on a "marketplace" that may house multiple different versions. The "marketplace", which may, for example, comprise a registry of software containers akin to the Docker hub repository, may be populated by developers (or dev-ops), and an administrator may choose which of those versions to use for which client device.

In a particularly advantageous embodiment, at least one instance of frontend software is running on a human-machine interface device as the client device. Because the operator of the plant needs to be informed at all times about the state of the process being executed, seamless operation of HMI devices is essential. If the screens of the HMI devices go blank, even for a moment, then anything can happen in that moment without anybody noticing. I.e., the process is effectively out of control of the operator. Even if the execution of the process is fully automated, this is not acceptable in most use cases. The situation is even worse if the degree of automation of the process is lower, i.e., if the execution of the process routinely relies on user input provided by the HMI and will not continue normally if such user input suddenly ceases.

The HMI device may, for example, be a normal PC, a laptop computer, a thin client, a smartphone, or a tablet computer. In a particularly advantageous embodiment, the at least one instance of frontend software is running inside a web browser application on the HMI device. In this manner, one and the same frontend software may be universally used on all sorts of devices, and it is particularly easy to adapt to the very different screen sizes of devices.

In a further particularly advantageous embodiment, at least one instance of frontend software is running on a low-level controller as the client device. Low-level controllers are even more critical for safe execution of the process than HMI devices. If a low-level controller is temporarily out of order, the process may be literally, physically out of control. For example, a pressure buildup in a reaction vessel with incompressible liquid may happen very quickly and cause the vessel to rupture if not stopped in time.

In a further particularly advantageous embodiment, at least one client device is configured to report, to the software manager, a result of an update process of the frontend software on this client device to a new version. Most advantageously, all client devices deliver such reports to the software manager. In this manner, the software manager can keep track of which version of the frontend software is installed on which client device. For example, when a migration to a new frontend software version is underway in the DCS, the progress of this migration may be tracked.

In a further particularly advantageous embodiment, the software manager is configured to, in response to receiving of a failed update process to a new frontend software version: stop indicating this new frontend software version to client devices. This means that the client devices will no longer see the new frontend software version as an available version, so no more client devices will install it. In this manner, any problem occurring with the update can be contained most quickly before it spreads further in the DCS.

In a further advantageous embodiment, the software manager is further configured to: in response to determining that all client devices have updated from an old version of the frontend software to a new version of the frontend software, cause the shutdown of instances of backend software that are configured to interface with the old version of the frontend software. Once all client devices have updated to the new version of the frontend software, they will all communicate with a new version of the backend software with which they are meant to interface. Older version of the backend software, which are configured to interface with older versions of the frontend software, are then no longer needed. Shutting them down frees up resources, eliminates sources of trouble (e.g., the old backend software might stop working after an operating system upgrade) and also closes security holes. The old backend software might have known security issues, which cannot be exploited anymore once this software has been shut down.

In a further advantageous embodiment, the software manager is further configured to: cause access to instances of backend software to be granted only to those client devices with a version of frontend software that is configured to interface with the version of the instance of backend software. For example, the software manager can update rules in a reverse proxy or other network device that is used by client devices to access backend software instances. In this manner, if an instance of frontend software attempts to connect to an instance of backend software that is running the wrong software version, this will fail completely and will be noticed quickly, rather than going ahead and causing some hard-to-detect and sporadic malfunction. Also, exposure of old versions of the backend software, which might have known security holes, is limited.

In a further particularly advantageous embodiment, the DCS further comprises a policy server. This policy server is configured to receive assignments of versions of frontend software to client devices from an administrator. The software manager is configured to receive these assignments from the policy server. In this manner, only versions of frontend software that have been assigned to a client device by virtue of the policy on the policy server will be made available to client devices. This may be used to gradually steer the update process to a new version.

In a further particularly advantageous embodiment, the software manager is configured to, in response to receiving of a failed update process to a new frontend software version: send a request to the policy server not to assign this new frontend software version to client devices anymore. In this manner, the further spread of a potentially problematic update can be stopped even if there are further software managers besides the one to which a client device that has reported an update problem is attached to.

In a further particularly advantageous embodiment, the policy server, and/or a separate advisor entity through which the assignments are passed to the policy server, is configured to check the assignments against a library of compatibilities between available versions of frontend software on the one hand and running versions of backend software on the other hand. In this manner, it is ensured that for every frontend software version that is made available to client devices, there is a suitable instance of backend software with the matching version running. That is, the administrator cannot command the rollout the new frontend software version before the new backend software version that this new frontend software version needs are up and running.

In a further particularly advantageous embodiment, the software manager is configured to receive a condition as to when frontend software on a client device shall be updated to new version from a user. In response to this condition being met, the new version of frontend software is indicated as available to the client device. In a simple example, when an HMI device as a client device boots up, a user may be offered a version selector showing all available software versions on the screen of the device.

For example, when the rollout of a new frontend software version is underway in a fleet of HMI devices, each HMI device may offer its user the possibility to either use the old software version or update to the new software version on boot-up. This means that a user who is in a hurry can defer the switch to the new software version. Once the user has selected the new frontend software version, and the update has been successful, the old frontend software version may be removed from the list of available software versions.

The condition as to when frontend software on a client shall be updated may be anything that fosters the goal of ensuring seamless operation of the DCS during the migration to the new frontend software version. For example, the condition may comprise a fixed time at which to update. This time may be chosen to be a time where a temporary outage of the client device will not cause the DCS as a whole to stop working. For example, there may be phases in the industrial process that is being executed on the plant that rely less critically on the availability of this particular client device. Another suitable condition is that the client device is in an idle state. For example, if nobody is using an HMI device at a certain moment, then a temporary failure of this HMI device at this moment will not deprive the plant operator of the control over the executed process altogether. The condition may also, for example, comprise the availability of redundancy in case the client device becomes unavailable. The temporary failure of a given client device due to an update problem is less of a risk for the functioning of the DCS as a whole if another client device is able to fill in for this particular client device.

By having the policy on the policy server on the one hand, and the condition for updating on the other hand, a separation of duties between an administrator of software versions on the one hand and a user of concrete client devices can be established. The administrator of software versions can best decide which software version is appropriate for which client device. But the user of the plant, or even the individual user of a client device, can best decide at which time the update to a new version is most appropriate. The knowledge which client devices are critical for the functioning of the DCS as a whole at which times, and/or stages of the executed industrial process, is highly plant specific. By contrast, deciding which software version is appropriate for which client device does not require a deeper insight into the process that is being executed.

The policy on the server may also implement any other sort of access control of users to frontend software versions. For example, users with different skill levels may be given access to frontend software versions with different feature sets. For example, unskilled users may be provided with a HMI with only basic functionality that does not require a deep understanding of the process (such as perusing through details of the plant state), users with an average skill level may be granted access to modify some basic goals of the process being executed (such as the desired throughput per hour), and advanced users may be given a HMI with full access to all settings of the low-level controllers. Such frontend software versions that only differ by the features they present to the user may all communicate with one and the same instance of backend software.

In a further particularly advantageous embodiment, at least one instance of frontend software is a Progressive Web Application, PWA. In particular, on a HMI device as a client device, a PWA may operate in a web browser and deliver a user experience that is very similar to that of a native app running on the client device. Thus, a PWA combines the advantage of a native app, namely that it can be installed on the client device and also start without a network connection, with the advantage of web content, namely that it can be run universally in modern web browsers without a need to develop separate versions for different types of client device. I.e., one and the same PWA may run on a thin client, on a tablet, and on a smartphone.

The advantages of PWA are also present if the client device is, for example, a low-level controller. Even if the goal of frontend software running on a low-level controller may be different from displaying information and receiving user interactions, the basic framework of PWA may still be used especially for distributing the frontend software.

In particular, a web worker of the PWA may be configured to obtain, from the software manager, an indication of whether new versions of the frontend software are available.

A web worker is a software component that is being executed in the background. For example, the web worker may listen for push notifications from the software manager that a new version of the frontend software is available.

The invention also provides a method for updating frontend software on a client device in the DCS described above.

In particular, the update may, for example, be carried out on a frontend application that is part of an overall frontend (micro-frontend).

The method starts with determining, by the client device, that a new version of the frontend software is available. This information may be obtained in any suitable manner. For example, the client device may actively poll the software manager for it, or it may receive a push notification from the software manager.

The client device then determines whether a predetermined condition for updating is met. For example, the client device may wait for a particular time, for an idle state, or for other client devices that might act as backup to come up.

In response to the condition being met, the client device backs up at least the configuration of the frontend software. This is the most important information that is needed for a rollback to the old version of the frontend software in case of a problem with the update. The old frontend software itself is replaceable; it may be downloaded again from a suitable download source.

After performing the backup, the new version of the frontend software is installed. It is then determined whether the installation is successful. If the installation is not successful, the frontend software is rolled back to the previously installed version using at least the backed-up configuration.

The backup of at least the configuration of the frontend software takes up much less space and can be performed quicker than a complete image of the state of the client device. Nonetheless, it enables the client device to restore the previous working state in case the update fails.

In an advantageous embodiment, the previous version of the frontend software is backed up as well. If space is available on the local storage of the client device, the whole frontend software may be written to this local storage. But the frontend software may also be stored in the form of a network location where it is available, such as a URL where it can be downloaded. Optionally, a hash value of the frontend software may be saved as well, so as to ensure that exactly the previous version will be rolled back. The backup of the old frontend software may also be written over a network to a server, so as to save local storage space on the client device. In particular, if the client device is a low-level controller, it may only have little mass storage available.

In a further particularly advantageous embodiment, the determining whether the installation is successful comprises performing a test suite for the new version of the frontend software. A test suite exercises a predetermined set of key functionalities of the frontend software in order to determine whether these functionalities work. The test suite may run on the client device, and/or it may probe the client device from the outside. For example, the test suite may test whether the updated client device is reachable from the network, whether it communicates to all entities it is supposed to, and/or whether the updated frontend software responds in an expected manner to certain inputs.

Both the functionality of the software manager in the system described above and the functionality of the method can be embodied in software. The invention therefore also relates to a computer program with machine-readable instructions that, when executed on one or more computers and/or compute instances, upgrade the one or more computers and/or compute instances to the software manager of the system described above, and/or cause the computers and/or compute instances to perform the method described above.

The invention also relates to a non-transitory machine-readable data carrier, and/or a download product, with this computer program. A download product is a digital product with the computer program that may, e.g., be sold in an online shop for immediate fulfilment and download to one or more computers. Also, one or more computers and/or compute instances may be equipped with the computer program, and/or with the machine-readable data carrier and/or download product.

All references, including publications, patent applications, and patents, cited herein are hereby incorporated by reference to the same extent as if each reference were individually and specifically indicated to be incorporated by reference and were set forth in its entirety herein.

LIST OF REFERENCE SIGNS 1 distributed control system, DCS
2 low-level controllers of DCS 1
3 high-level controller of DCS 1
3a instructions for executing industrial process
3b set-point values
3c values read from low-level controllers 2
4 human-machine interface, HMI, device of DCS 1
4a user input, provided to HMI device 4
4b state information, displayed by HMI device 4
5a, 5b instances of backend software
6a, 6b instances of frontend software
6c configuration of frontend software 6a, 6b
7 software manager for rolling out frontend software 6a, 6b
7a, 7b update feedback provided to software manager 7
8 policy server for assignments 9a
9 administrator for software versions
9a assignment of frontend software 6a, 6b version to client device
10 advisor entity
11 compatibility library for frontend-backend compatibility
12 user of DCS 1
12a condition for update
100 method for updating frontend software 6a, 6b on client device
110 determining that new frontend software 6a, 6b is available
120 determining whether condition 12a for update is met
130 backing up configuration 6c
131 backing up previous version of software 6a, 6b
140 installing new version of frontend software 6a, 6b
150 determining whether installation is successful
151 performing a test suite for new frontend software 6a, 6b
160 rolling frontend software 6a, 6b back to previous version The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A distributed control system (DCS) for controlling execution of at least one industrial process in an industrial plant, comprising:

one or more low-level controllers stored in one or more memories or one or more hardware low-level controllers configured to interact with field devices that are in a direct physical relationship with the industrial process;

at least one high-level controller stored in a memory or one hardware high-level controller configured to:

provide instructions for executing the industrial process, and/or set-point values at which at least one quantity of interest of the process and/or of the plant is to be kept, to the one or more low-level controllers; and/or read in sensor data of any type from sensor field devices, and/or any values of quantities of interest reported by the one or more low-level controllers;

at least one human-machine interface (HMI) device configured to:

receive, from a user, user input and transmit the user input and/or a work product derived from it the user input, to the at least one high-level controller; and receive, from the at least one high-level controller, state information of the process, and display the state information to the user;

at least a first instance and a second instance of backend software that are communicatively coupled to the high-level controller;

at least a first instance and a second instance of frontend software running on respective client devices of the plant; and a software manager that is at least configured to indicate, to each client device, which version of frontend software is available for this the client device, wherein the first instance of frontend software is of a version that is configured to interface with a version of the first instance of backend software, and the second instance of frontend software is of a different version that is configured to interface with a version of the second instance of backend software.

2. The system of claim 1, wherein at least one instance of frontend software is running on a human-machine interface device as the client device.

3. The system of claim 2, wherein the at least one instance of frontend software is running inside a web browser application on the human-machine interface device.

4. The system of claim 1, wherein at least one instance of frontend software is running on a low-level controller as the client device.

5. The system of claim 1, wherein at least one client device is configured to report to the software manager a result of an update process of the frontend software on this client device to a new version.

6. The system of claim 5, wherein the software manager is configured to, in response to receiving of a failed update process to a new frontend software version, stop indicating this new frontend software version to client devices.

7. The system of claim 5, wherein the software manager is further configured to, in response to determining that all client devices have updated from an old version of the frontend software to a new version of the frontend software, cause the shutdown of instances of backend software that are configured to interface with the old version of the frontend software.

8. The system of claim 5, wherein the software manager is further configured to cause access to instances of backend software to be granted only to those client devices with a version of frontend software that is configured to interface with the version of the instance of backend software.

9. The system of claim 1, further comprising a policy server, wherein the policy server is configured to receive, from an administrator, assignments of versions of frontend software to client devices; and wherein the software manager is configured to receive the assignments from the policy server.

10. The system of claim 9, wherein the software manager is configured to, in response to receiving a failed update process to a new frontend software version, send a request to the policy server not to assign the new frontend software version to client devices.

11. The system of claim 9, wherein the policy server, and/or a separate advisor entity through which the assignments are passed to the policy server, is configured to check the assignments against a library of compatibilities between available versions of frontend software and running versions of backend software.

12. The system of claim 1, wherein the software manager is further configured to receive from a user a condition as to when frontend software on a client device shall be updated to new version; and, in response to receiving from the user the condition, indicate the new version of frontend software as available to the client device.

13. The system of claim 12, wherein the condition comprises one or more of a fixed time at which to update; an idle state of the client device; and/or availability of redundancy in case the client device becomes unavailable.

14. The system of claim 1, wherein at least one instance of frontend software is a Progressive Web Application (PWA).

15. The system of claim 14, wherein a web worker of the PWA is configured to obtain from the software manager an indication of whether new versions of the frontend software are available.

*     *     *     *     *